A. I. ROOT & M. ANDREWS.
Improvement in Bee-Hives.
No. 128,072. Patented June 18, 1872.
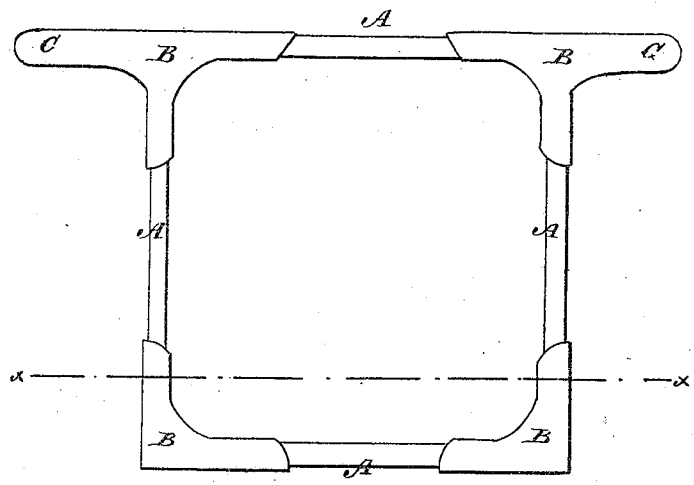
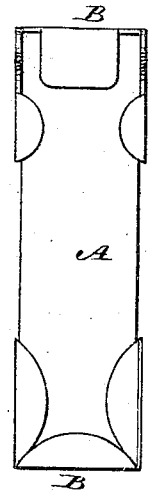
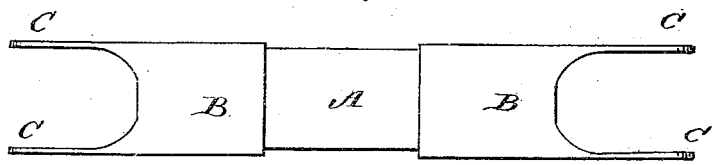
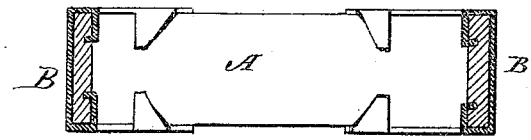
Witnesses:
Chas. Nida
N. A. Graham
Inventor:
A. I. Root
M. Andrews
Per Munn & Co.
Attorneys.

128,072

UNITED STATES PATENT OFFICE.

AMOS I. ROOT AND MEROA ANDREWS, OF MEDINA, OHIO, ASSIGNORS TO A. I. ROOT & COMPANY, OF SAME PLACE.

IMPROVEMENT IN BEE-HIVES.

Specification forming part of Letters Patent No. 128,072, dated June 18, 1872.

Specification describing a new and useful Improvement in Bee-Hive Honey-Frames, invented by AMOS I. ROOT and MEROA ANDREWS, of Medina, in the county of Medina and State of Ohio.

The object of this invention is to so construct the honey-frames of bee-hives that they may be readily taken from the hive or replaced without disturbing the bees, or so quietly as to cause no inconvenience. The ordinary hive-frame is fastened at the corners with nails, and it is difficult to detach the frame from the hive or the honey from the frame without more or less injury to the frame and greatly disturbing the bees. We secure our frame and support it in the hive by metallic corner pieces, and in the construction and arrangement of said pieces with reference to these functions our invention consists.

In the accompanying drawing, Figure 1 represents a frame constructed according to our invention. Fig. 2 is an end view. Fig. 3 is a top view; and Fig. 4 is a cross-section taken on the line x x.

Similar letters of reference indicate corresponding parts.

A represents the sides and ends of the frame, which are made of wood, and about the usual size. The corners of the frame are fastened by the metallic corner pieces B, formed of sheet metal, and so applied as to clasp the angle from the top and bottom to the outer and inner sides, as represented in the drawing, while they are so cut as to brace the frame in all directions. The arrangement is seen in the cross-section, Fig. 4, and also in Fig. 2. The pieces attached to the two upper corners of the frame have arms C projecting laterally, by which they are suspended in the hive.

The wax or "propolis" of the bee does not adhere to the metal as it does to wood, which allows the frame with metallic arms to be detached and taken from the hive with little difficulty.

Having thus described our invention, we claim as new and desire to secure by Letters Patent—

As articles of manufacture, the sheet-metal pieces B provided with the horizontal extensions or arms C, constructed substantially as shown and described, to adapt them to be applied to the adjacent ends of the top and side bars of the comb-frame to hold or receive them together, as set forth.

AMOS I. ROOT.
MEROA ANDREWS.

Attest:
EDWIN T. SMITH,
N. H. BOSTWICK.